United States Patent [19]

Dits et al.

[11] 4,170,876

[45] Oct. 16, 1979

[54] METHOD AND APPARATUS FOR CONTROLLING A PRESS PLUNGER SYSTEM

[76] Inventors: Herbert R. Dits, Adlerring 23, D-6612 Schmelz; Egon A. J. Bauer, St. Johanner Strasse 46, D-6602 Saarbrücken-Dudweiler, both of Fed. Rep. of Germany

[21] Appl. No.: 805,145

[22] Filed: Jun. 9, 1977

[30] Foreign Application Priority Data

Jun. 9, 1976 [DE] Fed. Rep. of Germany ....... 2625884

[51] Int. Cl.[2] .......................................... B60T 13/00

[52] U.S. Cl. .................................. 60/547 R; 60/567; 60/701; 60/716

[58] Field of Search ................. 60/327, 486, 537, 538, 60/542, 547, 560, 567, 578, 581, 698, 701, 716; 91/411 A; 92/151, 152

[56] References Cited

U.S. PATENT DOCUMENTS

| | | | |
|---|---|---|---|
| 2,962,001 | 11/1960 | Morton et al. | 91/411 A X |
| 3,942,323 | 3/1976 | Maillet | 60/560 X |

*Primary Examiner*—Edgar W. Geoghegan

*Attorney, Agent, or Firm*—Cushman, Darby & Cushman

[57] ABSTRACT

A drive system for use in a press in which a pneumatic cylinder and hydraulic pressure transformer are coupled together and connected by separate valves to respective gas and hydraulic sources. The valves are controlled by position transducers arranged along the path of movement of the output member of the transformer.

4 Claims, 13 Drawing Figures

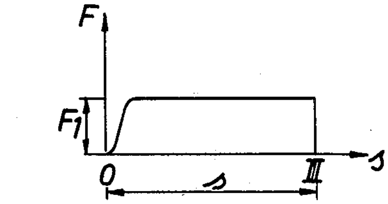
Fig. 7
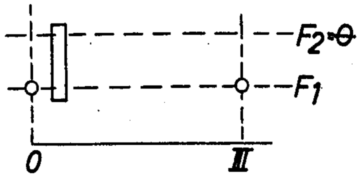
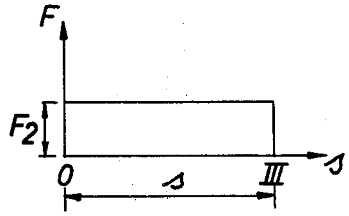
Fig. 8
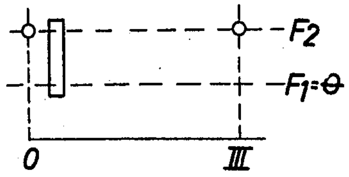
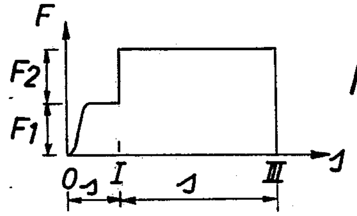
Fig. 9
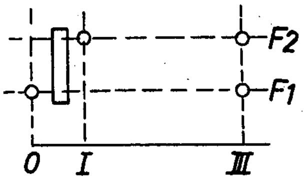
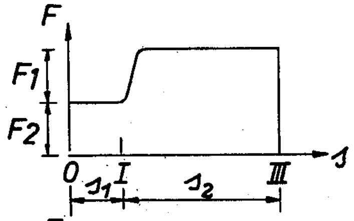
Fig. 10
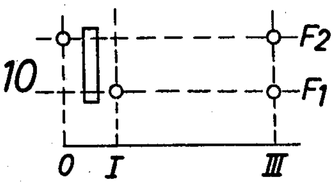
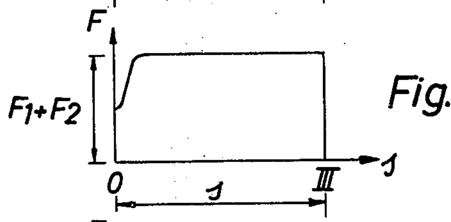
Fig. 11
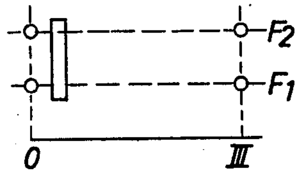
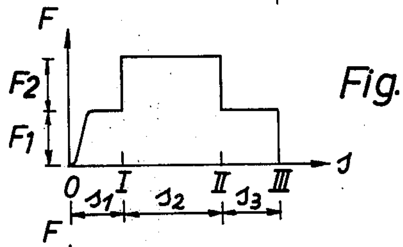
Fig. 12
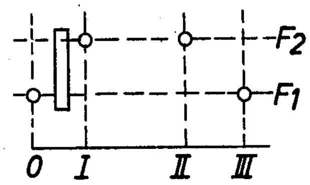
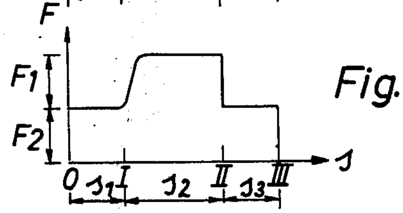
Fig. 13
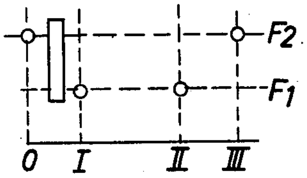

METHOD AND APPARATUS FOR CONTROLLING A PRESS PLUNGER SYSTEM

The present invention relates to a method of controlling the mechanical force or power produced by pneumatic or hydraulic means in a piston system comprising at least two cylinders, by selectively applying pressure to one or more pistons and by controlling the pressure of the medium used within the piston system.

In addition to mechanical presses and purely hydraulically operated presses, pneumatic-hydraulic presses have been developed in recent years, which presses utilize compressed air as their motive energy, whereby the mechanical power provided by the compressed air is multiplied in a hydraulic converter or transducer portion.

In the conventional press force multiplier shown in FIG. 1, the pressure $p_1$ of the compressed air acts upon one or more pistons (1) arranged in series and the mechanical force or power of which is transmitted to a plunger piston (2) such that an oil pressure $p_2$ is applied to a hydraulic piston (4) in the transducer portion. With increasing transmission ratio, the power increases and the stroke decreases in correspondence with the relation $$F_2 = \ddot{U} \cdot F_1;\ S_2 = S_1/\ddot{U};\ F_1 \cdot S_1 = F_2 \cdot S_2$$

wherein $F_2$=force developed by the press plunger (ram)
$F_1$=force produced by the plunger piston
$\ddot{U}$=transmission ratio
$S_1$=stroke of the plunger piston
$S_2$=stroke of the press plunger (ram).

The use of compressed air as an elastic medium is advantageous when sudden and excessive loads are involved. Further, the force exerted by the compressed air can be readily conformed to the required shaping techniques (rapid impact—slow impact), and this force additionally lends itself to easy control by control elements provided in the hydraulic transducer portion. Still further and mainly, compressed air is storable and harmless to the environment, and compressed air is available at least in medium and large manufacturing plants. Add to this that compressed air permits a high frequency of strokes (e.g., 100 strokes per minute). On the other hand, the compression pressure of normal compressed air installations is too low to be useful for purely pneumatically operated presses.

However, existing compressed air installations and conventional air pressure accumulators in general cannot be used for the afore mentioned pneumatic-hydraulic presses since the air flow capacity of such compressed air installations is too low. This applies not only to the capacity of the air compressor as such, but also, for example, to the cross-sectional areas and other parameters of the pipeline systems. Accordingly, it is a primary object of the present invention to provide a method and an apparatus which permit use of the abovementioned advantages of the combination of hydraulic presses with compressed air motive means in a structurally simple manner even if only a low or limited quantity of compressed air is available. This holds true particularly for medium to high press capacities and with respect to achieving particularly favorable force/-travel diagrams in which the starting and terminal points of two lengths of travel are adapted to be set independently of each other, wherein two different forces are effective through such distances.

In a method of the type as outlined at the beginning, the improvement provided by the present invention resides in the feature that the starting and terminal points of supplying two different pressurized media to at least two faces of jointly acting pistons are controlled independently by means of control elements the actuating members of which are adapted to be adjusted in the direction of plunger movement along the power stroke.

A further object of the present invention is to provide pneumatic-hydraulic driving means for producing a variable output force, comprising a plurality of coaxial cylinder chambers of identical or different diameters slidably receiving pistons therein, the forces of different magnitudes of said pistons being produced through jointly acting piston rods either in timed succession or simultaneously, whereby the net output force produced is adapted to be varied either incrementally by selectively disconnecting and connecting individual ones of the cylinder chambers, or continuously by varying the pressures of the pressurized working fluids. The driving means in accordance with the present invention is characterized in that control elements cooperating with the output member of the driving means are distributed along the path thereof so as to be adjustable to any desired distance, said control elements initiating and terminating the supply of pressure fluids to the pistons, two different pressure fluids being controlled independently to correspondingly pressurize two faces of two jointly acting pistons.

With the facilities provided by the present invention, pneumatic-hydraulic presses may be operated by a substantially smaller volume of air than prior art presses of the pneumatic hydraulic type. Thus, existing standard pressure air installations may be used. The interposition of an auxiliary hydraulic power source as taught by the present invention also allows minimizing pressure air since the positioning of the press plunger (ram) is effected by hydraulic oil instead of pressure air, while the pressure air is used only when the advantages offered thereby become particularly important, i.e., in the phase of shaping or deforming a workpiece. In this way, the consumption of compressed air is reduced to the phase of shaping the workpiece.

From the law of energy conservation, the demand of pressure air is calculated as:

$$V = F \cdot s/p, \text{ in liters per stroke}$$

wherein

F=output force, e.g., in Mp
s=travel of output member (e.g., in m)
p=air pressure (e.g., in bar). If the air pressure p is considered a constant parameter, the air demand is directly proportional to the force F provided by the output member and the travel s thereof. According to the present invention, the reduction of the quantity of air required is achieved by splitting up either the force F to be applied or the travel s, or both factors, into a sum of a pair of separate quantities each; more particularly one term of the sum is always produced by pneumatic means and the other term of the sum is produced by hydraulic means.

In a preferred embodiment of the present invention the control elements comprise initiators including an activating member assembly thereof forming part of a transducer as cooperating with a transducer connected to the output member the stationary portions of the transducers being adapted to be adjusted and fixed on a stationary bracket extending parallel to the axis of the output member. Pulses provided by the transducer arrangement are amplified and subsequently transmitted to servo-valves connected into the pressure fluid supply lines.

The driving means according to the present invention allows control of the force provided by the output member, throughout the power stroke of the press, using a parallel or a series arrangement of pistons and associated cylinders.

Furthermore, if a series arrangement of the pneumatic piston/cylinder units is used, one of the two power sources may be connected to a plurality of auxiliary hydraulic cylinders adapted to be controlled independently of each other.

Referring to the enclosed drawings, the present invention will be explained in greater detail, wherein:

FIGS. 7 to 13 show several arrangements of the control elements and corresponding force/travel diagrams.

Figure 1:
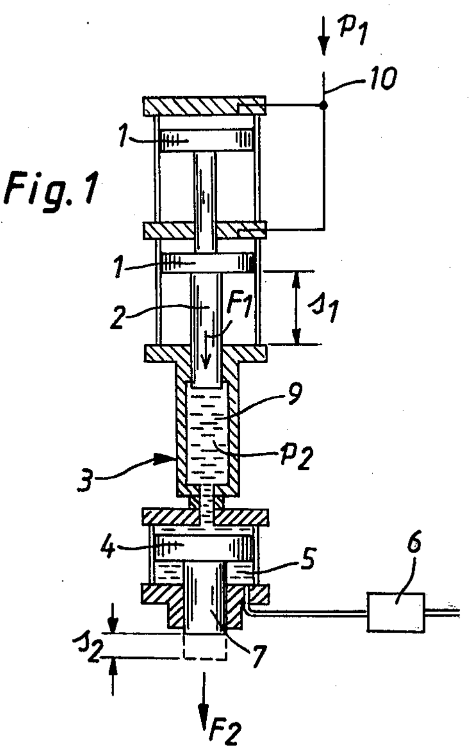
FIG. 1 is a schematical longitudinal sectional view of known press driving means.
Figure 2:
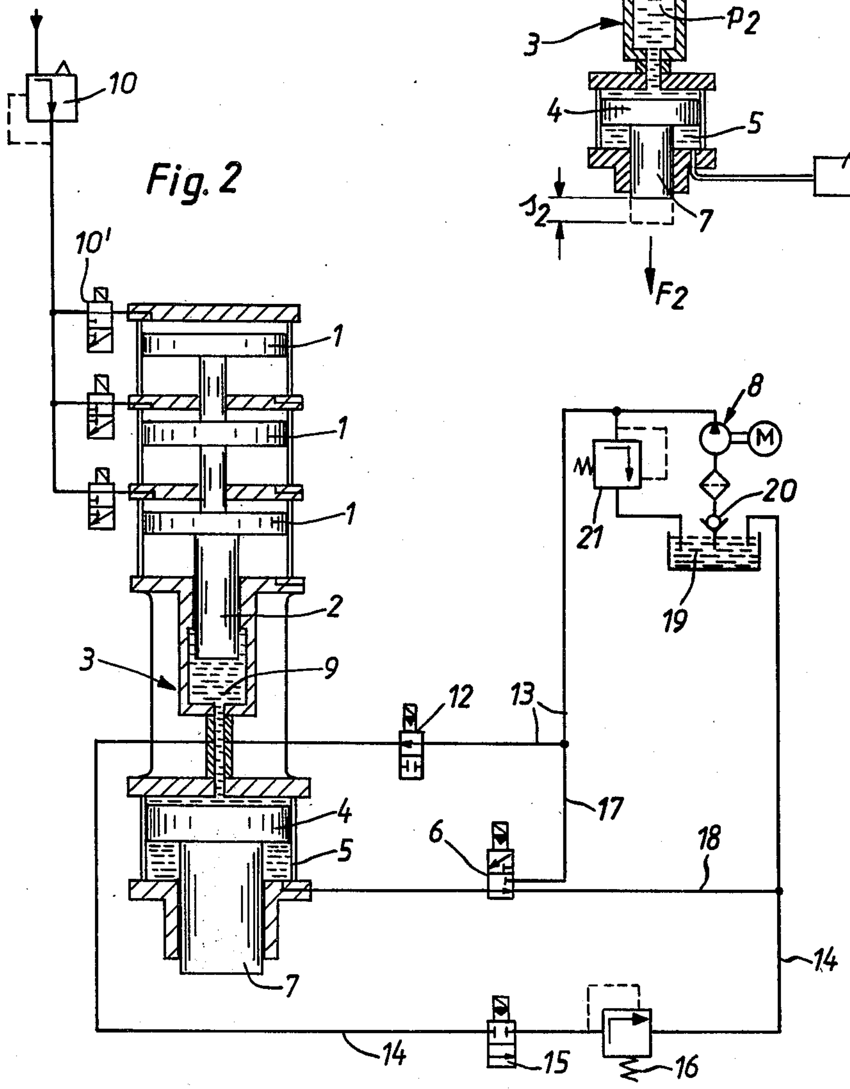
FIG. 2 is a schematical view of first driving means according to the present invention, partially shown in longitudinal section.

As shown in FIG. 2, press drive means are operated by the pressure $P_1$ of a pressure air source 10. Plunger piston 2 (provides an effective force $F_1$) provided by a plurality of serially arranged pneumatic pistons 1, which plunger piston produces a pressure $P_2$ in an input chamber of a hydraulic pressure converter portion 3. A hydraulic piston 4 of the converter portion 3 is exposed to the pressure $P_2$ of hydraulic liquid 9 (e.g., oil). The piston 4 is directly connected to a press plunger 7 providing a press force $F_2$. On the opposite side of the hydraulic piston 4, an oil chamber 5 is provided which is connected to a control element 6 for controlling the movement or stroke ($S_2$) of the press plunger 7.

In the embodiment of the invention shown in FIG. 2, an auxiliary hydraulic power source comprising a hydraulic pump 8 is provided serving to move the piston 4 through a first portion of its stroke, wherein the press plunger 2 is moved into engagement with the workpiece. To this end a third path between pump 8 and the inlet chamber of the converter portion 3 is established by control valve 12 and line 13. Subsequently, the actual press stroke, which is the second portion of the stroke of piston 4, is initiated by connecting the pressure air source 10 to the pneumatic pistons 1. The required volume of pressure air is reduced with respect to exclusive pressure air drive means by a factor corresponding to the second portion of the stroke of piston 4 over the total stroke thereof. Below the first portion of the stroke of piston 4 will be referred to also by the term positioning stroke.

Further, the motive forces exerted by the hydraulic pump 8 are controlled by means of a return line 14 including a further control valve 15 and a pressure limiting valve 16. Furthermore, the oil chamber 5 is also connectable to pump 8 and the return line 14 via a control valve 6 and lines 17 and 18 respectively. An oil reservoir 19 is connected to pump 8 via a check valve 20. A pressure relief valve 21 is connected between the feed side of pump 8 and reservoir 10. Control valves 12, 6 and 15 may be controlled by a central control unit (not shown).

Figure 3:
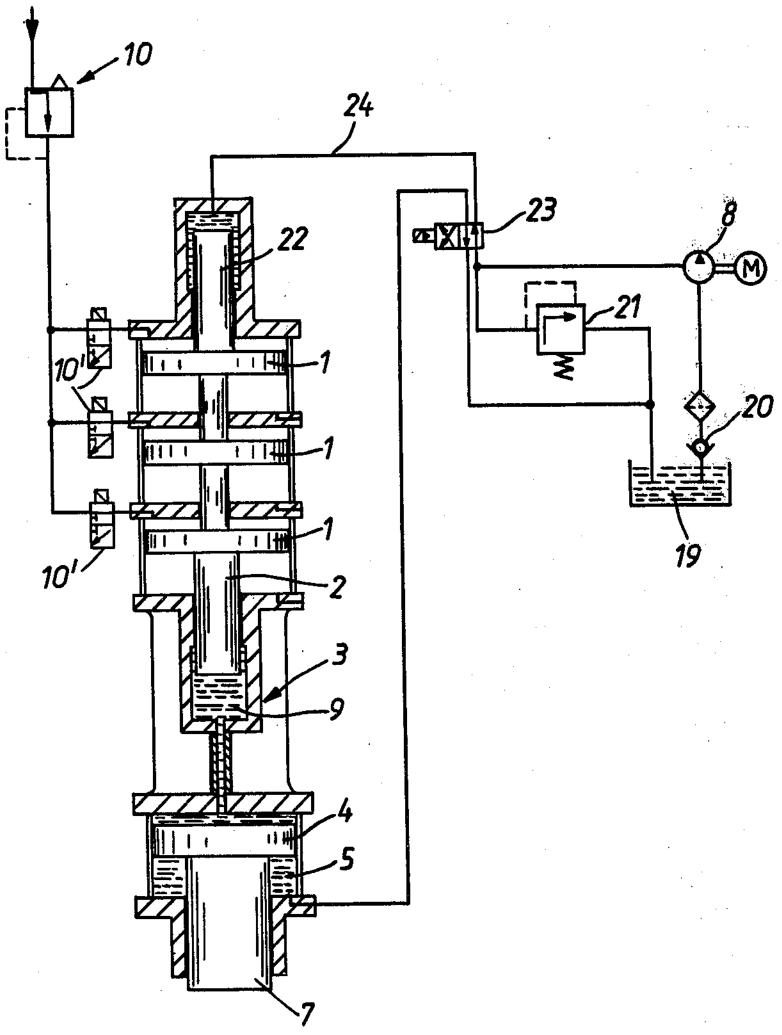
FIG. 3 is a schematical view similar to FIG. 2, wherein a second embodiment of the present invention is shown.

In an alternate embodiment shown in FIG. 3 the stroke of press plunger 7 is constant, since no hydraulic fluid is supplied to the inlet chamber of the converter portion 3. The net output force produced is obtained both from the hydraulic and the pneumatic system. Thus the system is a force adding one, while the system of FIG. 2 is a stroke adding one. The pressure oil is supplied by the hydraulic pump 8 through a control valve 23 and a power line 24 and acts upon an auxiliary plunger piston 22 connected to that side of the pneumatic piston 1 being remote from the press plunger 7. Thus, the pneumatic pressure and the pressure produced by the hydraulic pump act in tandem and simultaneously such that their effects sum up mechanically through the common piston rod to be finally applied to the plunger piston 2. The effective cross-sectional areas of both plunger pistons 2 and 22 may be chosen equal or different from each other. In a press drive means as shown in FIG. 3, the operating characteristics can be calculated as follows:

$$p = \frac{A_1 \cdot p_1}{A'_2} + p_2 \frac{A''_2}{A'_2} \quad \text{(I)}$$

$$F = p \cdot A_3 = A_3 \cdot \left[ p_1 \frac{A_1}{A'_2} + p_2 \frac{A''_2}{A'_2} \right] \quad \text{(II)}$$

$$s_1 = s_2 \cdot \frac{A_3}{A'_2} \quad \text{III}$$

wherein:

$F$=force provided by the press plunger $p$=pressure of hydraulic liquid 9

$p_1$=pneumatic pressure $p_2$=feed pressure of pump 8

$A_1$=cross-sectional area of the various pneumatic pistons 1

$A'_2$=cross-sectional area of plunger piston 2

$A''_2$=cross sectional area of the auxiliary plunger piston 22

$A_3$=cross-sectional area of piston 4

$s_1$=stroke of piston 1

$s_2$=stroke of hydraulic piston 4.

The value of the pressure air consumption appears in the square brackets of equation (II).

The embodiment of FIG. 3 allows free selection of the relative contributions of the pneumatic and hydraulic energy sources, providing the output force F may be varied via the ratio of the contribution of either pressure source to the output power.

In addition, the elasticity of the pressure force F produced is varied by the ratio of combination of both types of motive power. Therefore, in accordance with this invention it is possible to conform the elastic characteristic of the press to the specific working properties of the material and to the kind of forming used (drawing, cutting, stamping, etc.).

Figure 4:
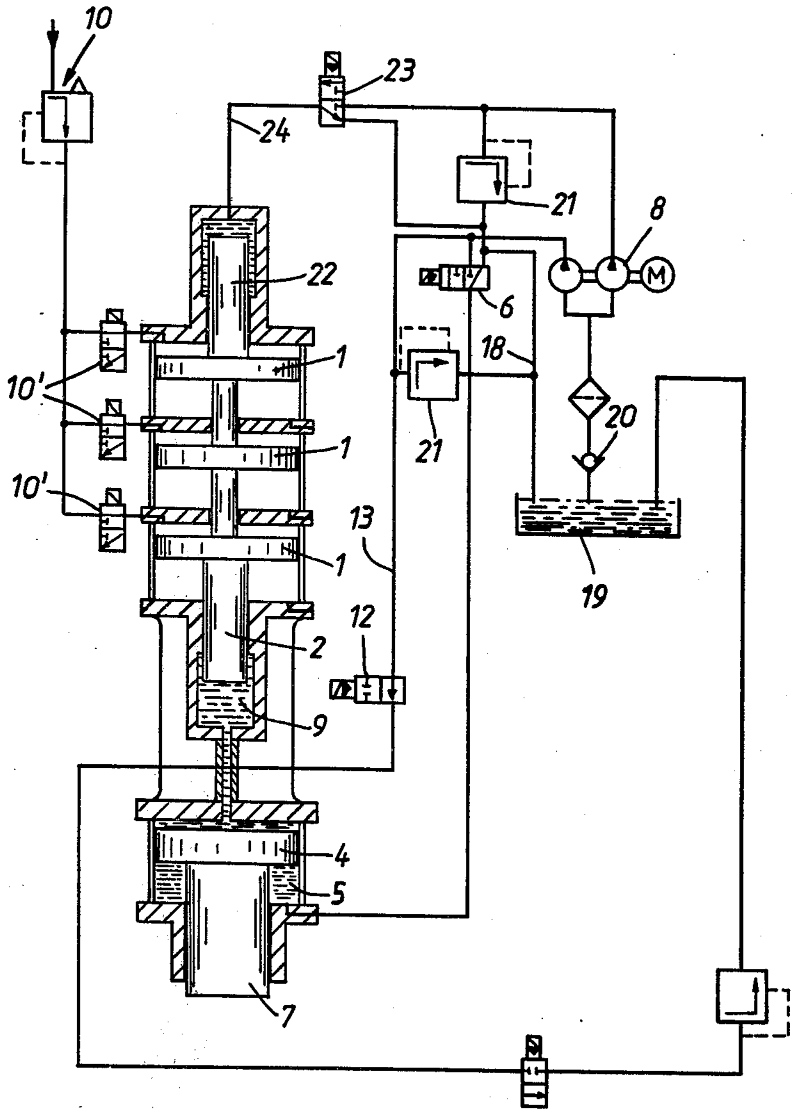
FIG. 4 shows a third embodiment of drive means in accordance with the present invention, the schematical view being similar to FIGS. 2 and 3.

The press drive means shown in FIG. 4 permits dividing both the power stroke ($s=s_1+s_2$) and the force ($F=F_1+F_2$) between the pneumatic and the hydraulic systems. The positioning stroke $s_1$ is effected by one of a plurality of hydraulic pumps 8 through line 13 and control valve 12. The power stroke $s_2$ of the press as such is assisted by the auxiliary plunger piston 22, receiving pressure oil through control valve 23 and power line 24. Thus the forces provided by plunger 22 and the pistons are added. So the embodiment of FIG. 4 provides for maximum economy in the consumption of pressure air.

Figure 5:
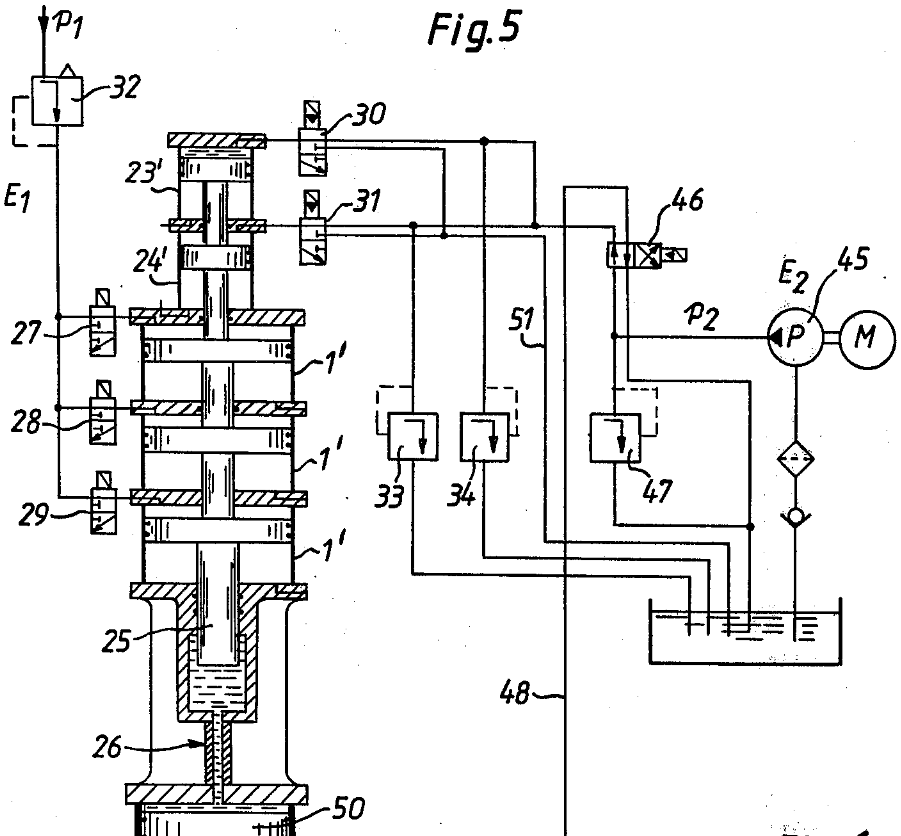
FIG. 5 is a similar schematical view of press drive means in accordance with the present invention including control means to select one of a plurality of various modes of energizing the output member.

FIG. 5 shows further modified press drive means, wherein the contributions of the pneumatic and the hydraulic system to the net output power may be varied in accordance with the travel of the press plunger. Also in this system we have:

$$E=E_1+E_2$$

, wherein:

$E$=total energy $E_1$=pneumatic energy $E_2$=hydraulic energy.

If the stroke s is considered constant, the above equations may be rewritten $$F=F_1+F_2$$

, wherein:

$F$=total output force $F_1$=portion of the output force produced by the pneumatic system $F_2$=portion of the output force produced by the hydraulic system.

In force adding drive systems as shown in FIG. 3 and FIG. 5, as well as in the force and stroke adding drive system of FIG. 4 providing of the force components $F_1$ and $F_2$ can be controlled, in accordance with travel of the press plunger. This will now be explained in more detail referring to FIGS. 5 to 13.

In the pneumatic-hydraulic drive system of FIG. 5, three pneumatic cylinders 1' and two auxiliary hydraulic cylinders 23' and 24' are positioned in coaxial relation, whereby the mechanical forces produced in the pneumatic and hydraulic systems add to supply cumulative force to plunger 25 which in the embodiment shown is formed as a plunger piston having a hydraulic pressure converter 26 connected in series thereto.

Pneumatic energy $E_1$ and hydraulic energy $E_2$ are fed separately at each of the cylinders 1' through electrically operated 3/2-way valves 27, 28, 29 and 30, 31, respectively. With this arrangement, the following effects are obtained.

(1) The maximum plunger force $F=F_1+F_2$ produced by the pneumatic bias pressure $p_1$ and the hydraulic bias pressure $p_2$ may be reduced incrementally by blocking the pressure fluid supply to individual ones of the cylinders 1', 23', 24'.

(2) With the hydraulic energy supply being completely blocked by valves 30 and 31, the drive system will operate in a purely pneumatical mode; or alternatively, by fully blocking the pneumatic energy (power) supply (valves 27, 28, 29), the press motive means operate in a purely hydraulical mode.

(3) By controlling the above-mentioned valves as a function of travel of plunger 25, both switching on and off of the pneumatic and/or hydraulic power may be effected as required (compare the diagrams of FIGS. 9 to 13).

In addition to the incremental control of the force F provided by plunger 37 as indicated above in item 1, this force may be controlled continuously by setting the switching point of pressure relief valves 32, 33 and 34 to values smaller than the maximum value of $p_1$ and $p_2$, such that, by making use of both incremental and continuous control, any desired value $F<F$ max. may be obtained.

Figure 6:
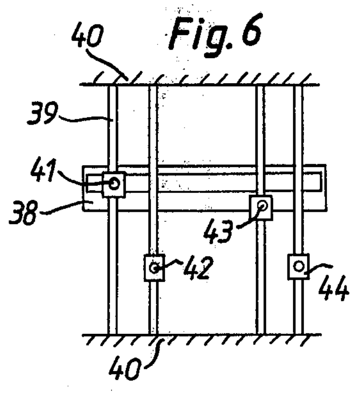
FIG. 6 is an enlarged plan view of the control elements of FIG. 5.

In the drive system of FIGS. 5 and 6, electrical actuation of the 3/2-way valves 27 to 31 in accordance with travel of plunger 37 (see supra item 3) is effected by contact free position transducers 35 adapted to be adjusted along the path of plunger 37, which can be replaced by mechanically operated limit switches if desired. Actuating pins 36 are secured to a hammer plate 38 secured to the press plunger 37. The transducers 35 are adjustably carried by brackets 39 fixed to a press frame 40. Transducers 41 and 42 shown in FIG. 6 provide electrical command signals used in switching on and off the pneumatic pressure, while transducers 43 and 44 control the supply of hydraulic power. With the transducer arrangement of FIG. 6 the force/travel diagram of FIG. 9 is obtained.

Pneumatic power is supplied by a compressor, the operating pressure normally being set to 6 bar. Hydraulic energy is supplied by a hydraulic pump 45. The pressure oil is supplied to the hydraulic cylinders 23' and 24' via a 4/2-way valve 46. A pressure relief valve 47 is provided for returning excess pressure oil. To initiate a return stroke, valve 46 is energized such that the pressure oil provided by pump 45 is directed to the lower face 49 of power piston 50 via line 48. At the same time, the 3/2-way valves 27, 28 and 29 of the pneumatic system are switched into the vent position, and the 3/2-way valves 30 and 31 of the hydraulic system are moved into their vent positions wherein a fluid connection between the cylinders 23' and 24' and a return line 51 is established. Numerals I, II and III in FIGS. 7 to 13 indicate various points of travel of plunger 37 where switching on or off at one of the pressure fluid sources is effected.

What we claim is:

1. A hydro-pneumatic drive system for use in a press having a press plunger comprising:

a pneumatic cylinder assembly adapted to be connected to a pressure gas source;

a hydraulic pressure transformer, the input member of which is connected to the output member of the pneumatic cylinder assembly and the output member of which is connected to the press plunger;

a first control valve means for connecting the pressure gas source to the pneumatic cylinder assembly;

a second control valve means for connecting the working space of the pressure transformer to a pressure liquid pump;

an actuating member mounted for common movement with the output member of the pressure transformer; and a plurality of position transducers arranged along the path of the output member of the pressure transformer, each of said position transducers being adapted to effect either opening or closing of at least one of the control valve means in accordance with the position of said output member.

2. A drive system as in claim 1, wherein the working space of the pressure transformer is connected to a liquid return line through a pressure limiting valve.

3. A drive system as in claim 1, further including a hydraulic cylinder assembly having its piston rod connected to the piston rod of the pneumatic cylinder assembly, and a third control valve means for connecting said cylinder assembly to said liquid pump.

4. A drive system as in claim 3, wherein said hydraulic cylinder assembly includes a plurality of hydraulic cylinders, a plurality of separate pressure limiting valves connecting said cylinder assembly to a return line and wherein said third assembly includes separate control valves for connecting said cylinder assembly to said pump.

* * * * *